United States Patent [19]
Umezawa et al.

[11] Patent Number: 5,135,082
[45] Date of Patent: Aug. 4, 1992

[54] BRAKE BAND

[75] Inventors: Shigeki Umezawa, Fujisawa; Yoshiaki Kato, Yokohama, both of Japan

[73] Assignees: NSK-Warner K. K.; Nissan Motor Co., Ltd., Tokyo, Japan

[21] Appl. No.: 473,605

[22] Filed: Feb. 1, 1990

[30] Foreign Application Priority Data

Feb. 3, 1989 [JP] Japan ................... 1-11463[U]

[51] Int. Cl.⁵ ........................... F16D 53/00
[52] U.S. Cl. .................. 188/77 W; 188/77 R; 188/259
[58] Field of Search ............ 188/259, 261, 77 R, 188/77 W, 249, 264 B, 264 E

[56] References Cited

U.S. PATENT DOCUMENTS

| | | | |
|---|---|---|---|
| 630,281 | 8/1899 | Alden | 188/264 B |
| 1,286,171 | 11/1918 | Cory | 188/259 |
| 1,480,717 | 1/1924 | Fournier | 188/264 B |
| 1,842,102 | 1/1932 | Knight | 188/264 B X |
| 4,023,656 | 5/1977 | Kuwahara et al. | 188/77 R X |
| 4,930,373 | 6/1990 | Nakawaki et al. | 188/77 R X |

Primary Examiner—Robert J. Oberleitner
Assistant Examiner—Peter M. Poon
Attorney, Agent, or Firm—Shapiro and Shapiro

[57] ABSTRACT

A brake band for use in a transmission for a vehicle for example, has a greater oil discharge (removing) area in the portion of a lining which is near the apply side end of the brake band than in the portion of the lining which is on the anchor side of the brake band, thereby enhancing the oil discharge characteristic and reducing the shock during speed change.

14 Claims, 5 Drawing Sheets

BRAKE BAND

BACKGROUND OF THE INVENTION

1. Field of the Invention

This invention relates to a brake band such as for use in the transmission of a vehicle (e.g., an automobile, an agricultural machine or construction equipment).

2. Related Background Art

In automatic transmissions, multiplate clutches, brake bands, etc. are used to effect speed change with an input element such as a gear train fixed and opened. Among these, the brake band is widely used because it has the characteristic that its braking force differs depending on the braking direction of a drum even if the same acting force is applied thereto. It also has the advantageous characteristic that it makes up-shift smooth.

As the construction of a brake band according to the prior art, there is one as shown, for example, in FIG. 7 of the accompanying drawings.

In FIG. 7, a brake band 7 is comprised of a strap 3 of curved thin steel plate having an adhesive agent applied thereto, brackets 4 and 4' coupled to the opposite ends of the strap 3, and a porous thin friction material (lining) 2 adhesively secured to the curved strap 3. The bracket 4 is an input side (apply side) bracket on which oil pressure force for operating the brake acts, and the bracket 4' is a support point side (anchor side) bracket.

In such a conventional brake band, there are sometimes provided an oil groove 5 and oil apertures 6 in the lining to improve the oil discharge characteristic between the drum and the lining in the binding process of the band brake. With prior structures of this type, speed change shock has been a significant problem. In particular, the discharge of the oil film intervening between the drum and the lining of the binding process of the band brake is low during the early stage of binding, with a resulting low friction characteristic. Toward the end of binding, however, the binding force suddenly increases, and this causes speed change shock. If the number of oil grooves and the number of (removing) discharge apertures are increased to further enhance the oil discharge performance, the surface pressure of the lining will increase and there will arise a problem in durability. In addition, if discharge apertures are formed in the brackets 4 and 4', the strength of the brackets may be reduced, and this can lead to damage of the brackets.

SUMMARY OF THE INVENTION

The present invention overcomes the above-noted problems by recognizing that in the non-bound state of the drum, the clearance between the lining and the drum (when the band brake is used in a so-called leading state) is greater near the apply side than the anchor side and that the amount of oil film to be discharged (removed) from the former clearance is thus also greater. Accordingly, the number of through-apertures and the number of oil grooves in the lining in the area on which the bracket near the apply side is mounted, or their total area, is made greater than the number of through-apertures and the number of oil grooves, or their total area, in a similar area near the anchor side, thus eliminating the above-noted problems.

BRIEF DESCRIPTION OF THE DRAWINGS

FIGS. 6-1 and 6-2 show a comparison between the output shaft torques of the brake band according to the prior art and the brake band according to the present invention.

DESCRIPTION OF THE PREFERRED EMBODIMENT

The brake band according to the present invention will hereinafter be described in detail with reference to the accompanying drawings.

Figure 1:
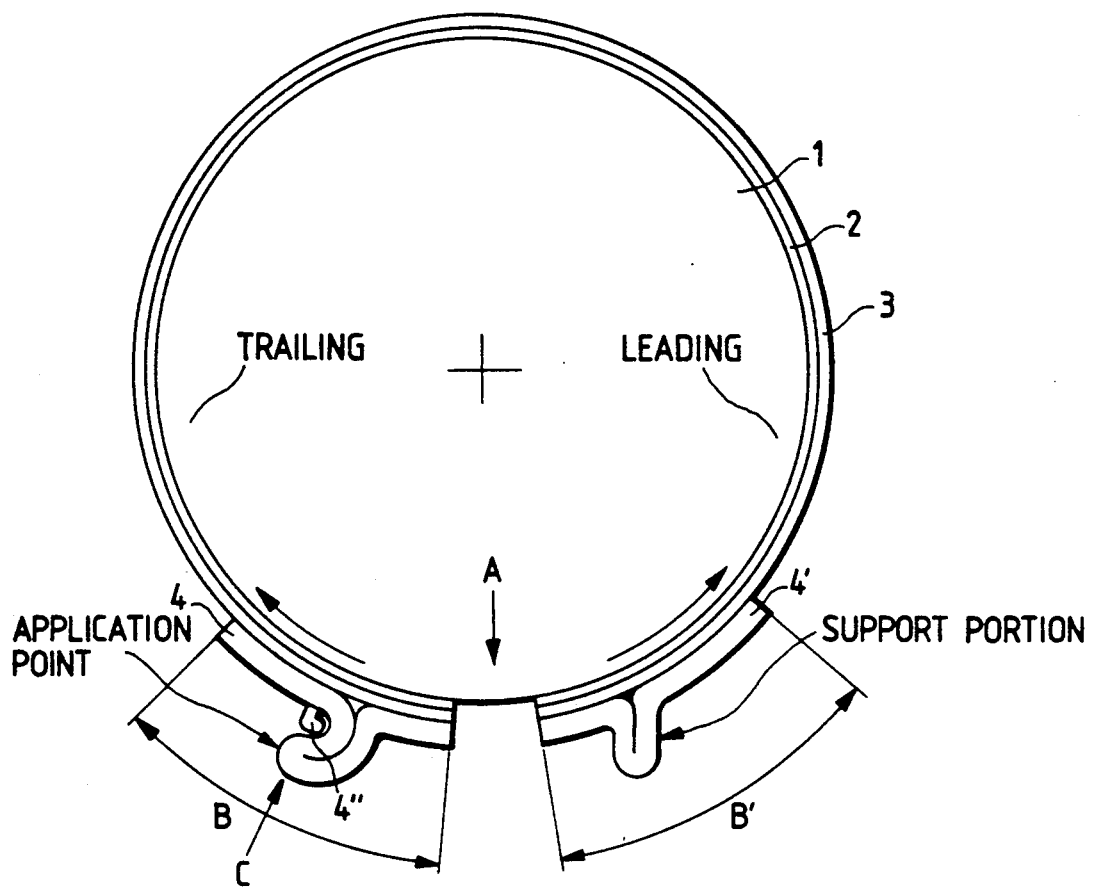
FIG. 1 shows the structure of a brake band according to the present invention.
Figure 7:
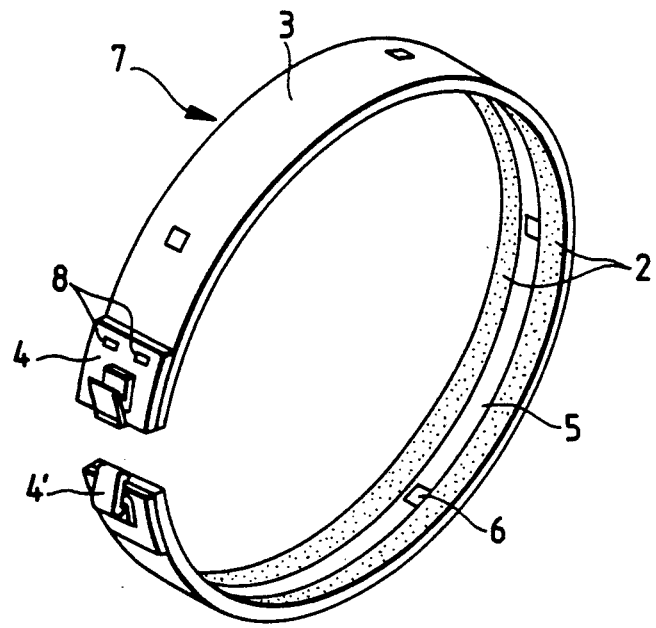
FIG. 7 shows the structure of a brake band according to the prior art.

FIG. 1 is a view of the brake band according to the present invention disposed about a drum 1, as seen in an axial direction. Members similar to those in previously discussed FIG. 7 are given similar reference numerals and need not be described. The reference numerals 4 and 4' designate brackets on the apply side (the application portion side) and the anchor side (the support portion side), respectively, and the reference numeral 4" denotes a strut guide provided by turning back a portion of the apply side bracket 4.

Figure 3:
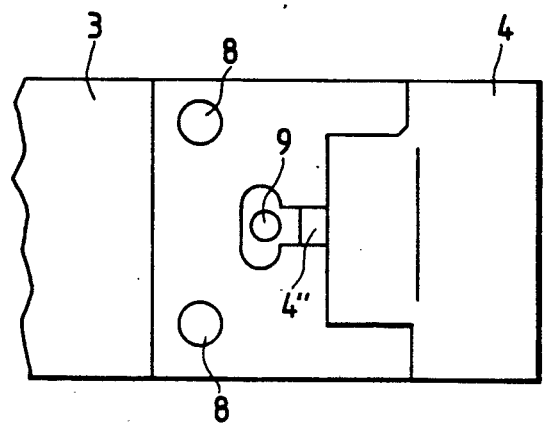
FIG. 3 shows the shapes of knock pin holes and a strut guide punched hole in a bracket.
Figures 1, 6:
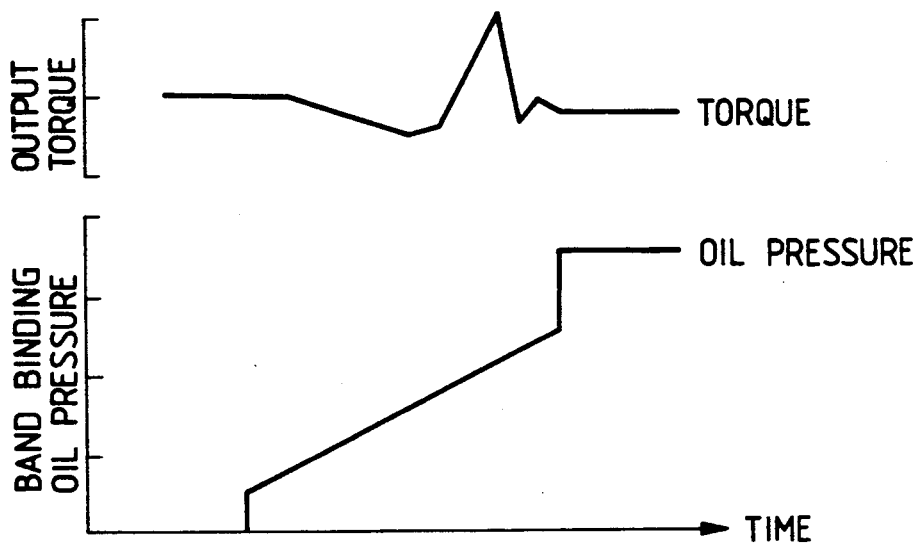
Figures 2, 6:
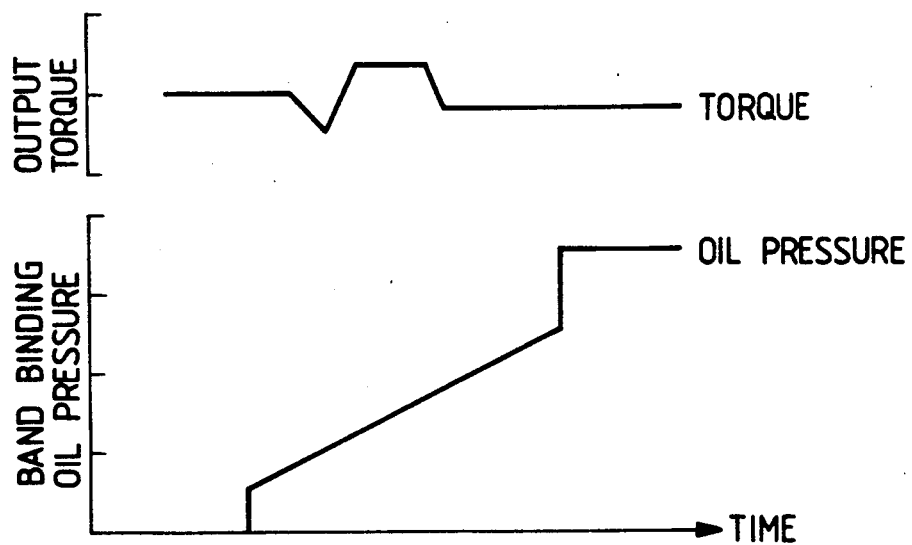

FIG. 2 is a view of the lining near the anchor side bracket and the apply side bracket as it is seen in the direction of arrow A in FIG. 1. The lining area near the apply side bracket is indicated as B, and the lining area near the anchor side bracket is indicated as B'. In the areas of the lining 2 which are near the two brackets, there are formed oil grooves 10 and through-apertures 8 and 9 to eliminate oil between the lining and the drum 1. If a punched hole for the strut guide 4" is used also as the through-aperture 9 and knock pin holes in the apply side bracket 4 are used also as the through-apertures 8, it is not necessary to provide a special aperture forming process and the cost of manufacture can be reduced. FIG. 3 is a view taken along the direction of arrow C in FIG. 1 to show an arrangement wherein the knock pin holes and the punched hole for the strut guide are used also as oil apertures.

Figure 2A:
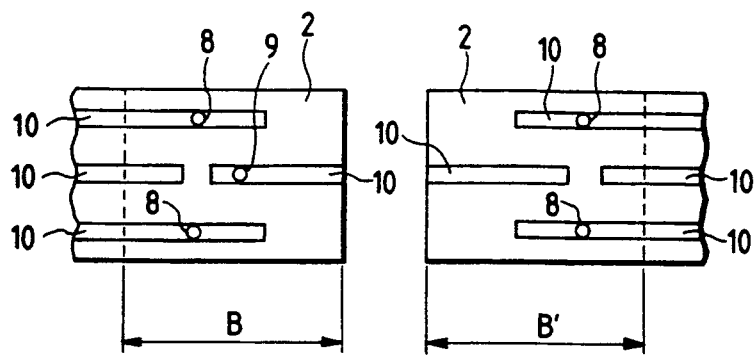
FIGS. 2A to 2D show the shapes of oil grooves and oil apertures formed in a lining.
Figure 2B:
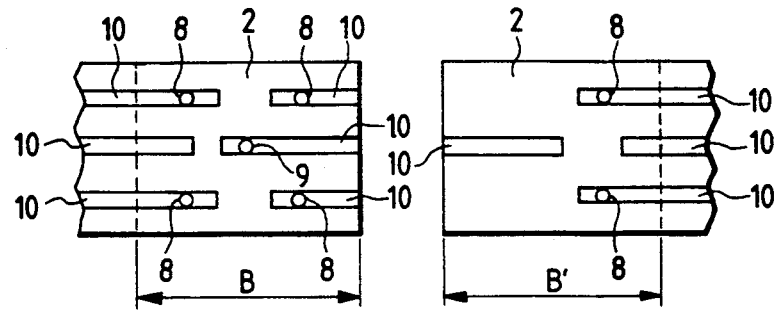
Figure 2C:
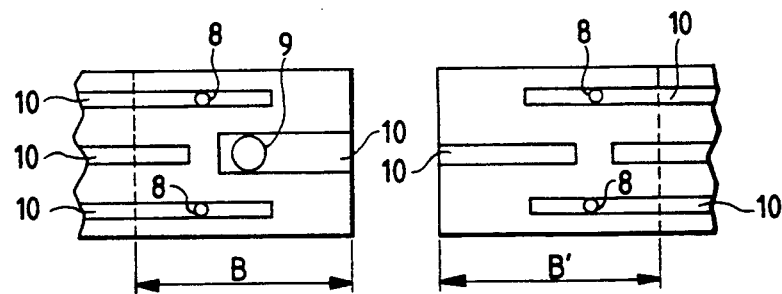
Figure 2D:
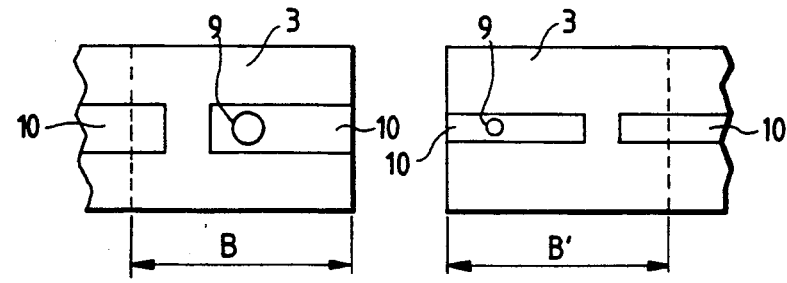
Figure 4:
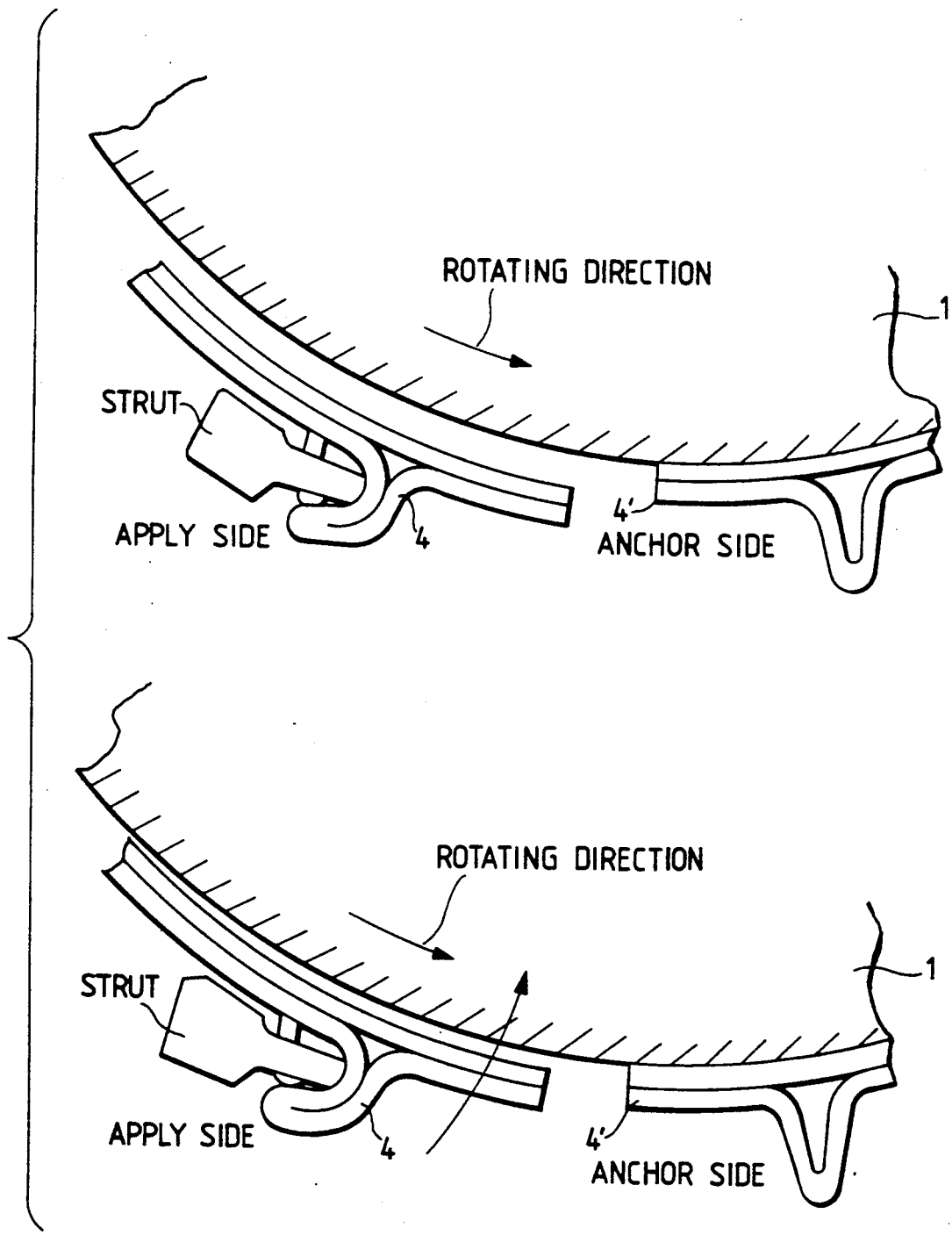
FIG. 4 shows the states of the brake band during the non-binding thereof and during the binding thereof.

When the brake band is used in the leading state, as shown in FIG. 4, in the non-binding state, the anchor side of the lining 2 is in contact with the surface of drum 1 and the clearance between the lining 2 and the drum 1 at the apply side is maximum. Thus, the amount of oil film between the lining 2 and the drum 1 is greatest at the time of initial application of the brake. To obtain a basically flat friction characteristic from the early stage of binding until the end of binding, i.e., to mitigate the shock during speed change, the invention assures that the great amount of oil contained on the apply side may be discharged (removed) within a short time. More particularly, in the brake band according to the present invention, in order that the oil near the apply side may be rapidly eliminated, the number of oil grooves formed in that area of the lining on which the bracket 4 on the apply side is mounted, the width of the grooves, or the number of through-apertures 8 and 9 and the areas thereof are made greater than in the lining near the anchor side. FIGS. 2A-2D show embodiments in accordance with this principle. FIG. 2A shows an embodiment in which an oil aperture 9 is added on the apply side, and FIG. 2B shows an embodiment in which on the anchor side there are two oil apertures, whereas on the apply side there are provided five oil apertures, and further in which the number of oil grooves is six on the apply side as compared with four oil grooves on the anchor side. In FIGS. 2C and 2D, the number and/or areas of oil grooves and oil apertures are varied to thereby increase the oil discharge characteristic on the apply side relative to the anchor side. It is apparent, of course, that by appropriately combining different widths and/or numbers of oil grooves with different sizes and/or numbers of oil apertures, many other arrangements consistent with the basic principle of the invention are possible.

It should be noted that the apply side is oriented in the so-called energy are made great as described above, there is no problem with respect to strength at the apply side.

Figure 5:
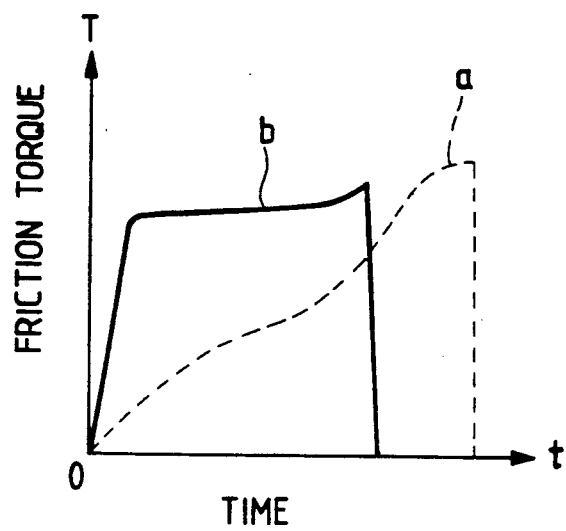
FIG. 5 is a graph showing the comparison between the friction characteristics of the brake band according to the prior art and the brake band according to the present invention.

The apply side is in the so-called energe direction and therefore, during braking, the surface pressure applied to the lining on the apply side is usually ½ or less of the surface pressure applied to the lining on the anchor side. Accordingly, even if the number and width of oil grooves and the number and area of through-apertures in the lining on the apply side FIG. 5 is a graph in which the friction characteristic of the brake band according to the prior art during braking and the friction characteristic of the brake band according to the present invention during braking are compared with each other. As compared with the brake band according to the prior art, which is indicated by dashed line a, the brake band according to the present invention has greater friction torque immediately after the start of braking and exhibits a good torque characteristic.

FIG. 6 shows a comparison between the torque fluctuation of the brake band according to the prior art during up-shift speed change and the torque fluctuation of the brake band according to the present invention during up-shift speed change. The difference between the peak of the output torque during speed change and the output torque after the termination of speed change is felt as a speed change shock. FIG. 6-1 is a graph showing a case where the band brake according to the prior art is used. The oil film eliminating characteristic on the apply side is bad and therefore, the binding force of the brake after the start of speed change is initially low. Thereafter, a speed reduction occurs suddenly and thus, a great speed change shock is created. In contrast, in the brake band according to the present invention shown in FIG. 6-2, speed reduction is effected well and the speed change shock is reduced.

As described above, according to the present invention, by a very simple construction in which the area of the oil discharge means such as oil grooves and oil apertures formed in the part of the lining which is near the apply side bracket is made larger than the area of the oil discharge means in the part of the lining which is near the anchor side, the oil film discharging function when the brake band is operated in the leading state is enhanced and a flat friction characteristic is obtained from the early stage of binding. Thus it becomes possible to reduce the shock during speed change.

We claim:

1. A brake band comprising a band portion having a brake lining attached to an inner peripheral surface thereof, and characterized in that said brake lining has oil discharge means formed in substantially equal length portions thereof located substantially at apply side and anchor side ends of the brake band for discharging oil from between said brake lining and a braking surface with which said brake lining is to be engaged, and the total area of the oil discharge means formed in said portion of said lining located substantially at the apply side end of the brake band is larger than the total area of the oil discharge means formed in said portion of said lining located substantially at the anchor side end of the brake band.

2. A brake band according to claim 1, characterized in that each said oil discharge means includes at least one of oil grooves and oil apertures.

3. A brake band according to claim 2, characterized in that at least one of an apply side end bracket and an anchor side end bracket attached to said band portion is formed with holes in communication with the oil discharge means near the corresponding end of the brake band.

4. A brake band according to claim 3, characterized in that said holes include at least one of a knock pin hole and a punch hole for a strut guide.

5. A brake band comprising a band portion having a brake lining attached to an inner peripheral surface thereof, and characterized in that said brake lining has oil discharge means formed in substantially equal length portions thereof located substantially at apply side and anchor side ends of the brake band for discharging oil from between said brake lining and a braking surface with which said brake lining is to be engaged, and the oil discharge means formed in said portion of said lining located substantially at the apply side end of the brake band includes a greater number of oil discharging structures than the oil discharge means formed in said portion of said lining located substantially at the anchor side end of the brake band.

6. A brake band according to claim 5, characterized in that said oil discharge structures include at least one of oil grooves and oil apertures.

7. A brake band comprising a band portion having a brake lining attached to an inner peripheral surface thereof, and characterized in that said brake lining has oil discharge means formed in substantially equal length portions thereof located substantially at apply side and anchor side ends of the brake band for discharging oil from between said brake lining and a braking surface with which said brake lining is to be engaged, the oil discharge capacity of the oil discharge means formed in said portion of said brake lining located substantially at the apply side end of the brake band being greater than that of the oil discharge means formed in said portion of said brake lining located substantially at the anchor side end of the brake band.

8. A brake band according to claim 7, characterized in that each said oil discharge means includes at least one of oil grooves and oil apertures.

9. A brake band according to claim 8, characterized in that at least one of an apply side end bracket and an anchor side end bracket attached to said band portion is formed with holes in communication with the oil discharge means near the corresponding end of the brake band.

10. A brake band according to claim 9, characterized in that said holes includes at least one of a knock pin hole and a punch hole for a strut guide.

11. A brake band comprising a band portion having a brake lining attached to an inner peripheral surface thereof and provided with apply side and anchor side brackets respectively at apply side and anchor side ends thereof, and characterized in that said brake lining has oil discharge means formed therein beneath said apply side and anchor side brackets for discharging oil from between said brake lining and a braking surface with which said brake lining is to be engaged, the oil discharge capacity of the oil discharge means formed beneath said apply side bracket being greater than that of the oil discharge means formed beneath said anchor side bracket.

12. A brake band according to claim 11, characterized in that each said oil discharge means includes at least one of oil grooves and oil apertures.

13. A brake band according to claim 12, characterized in that at least one of said apply side bracket and said anchor side bracket is formed with holes in communication with the oil discharge means formed therebeneath.

14. A brake band according to claim 13, characterized in that said holes include at least one of a knock pin hole and a punch hole for a strut guide.

* * * * *